United States Patent [11] 3,580,091

| [72] | Inventors | Lloyd Spencer<br>220 Patrician Way, Pasadena, Calif. 91105;<br>Tor Petterson, 1344 E. 6th St., San Pedro, Calif. 90731 |
|---|---|---|
| [21] | Appl. No. | 814,991 |
| [22] | Filed | Apr. 10, 1969 |
| [45] | Patented | May 25, 1971 |

[54] ACTUATOR FOR MIXING VALVE
6 Claims, 8 Drawing Figs.
[52] U.S. Cl. ................................................ 74/107,
137/636.1
[51] Int. Cl. ................................................ F16h 21/44
[50] Field of Search........................................ 251/86;
137/636.2, 625.4, 636.1; 287/87; 74/107, 104,
102

[56] References Cited
UNITED STATES PATENTS
3,220,755 11/1965 Gottschald et al............ 287/87
3,309,117 3/1967 Gottschald................... 287/87
3,395,733 8/1968 Spencer....................... 137/636.2

Primary Examiner—M. Cary Nelson
Assistant Examiner—Michael O. Sturm
Attorney—Lloyd Spencer ABSTRACT: An actuator for a hot and cold water mixing valve, the valve terminating in a journal ball in which is mounted a pair of valve operating cam followers movable in parallel axes, the journal ball terminating in an annular stop shoulder; the actuator including an inner cap member having internal cam areas engageable by the cam followers and a peripheral movement limiting cam engageable with the stop shoulder, the cap member covering more than half the journal ball and slitted so as to be fitted thereon or removed therefrom; and a shell member conforming to the inner cap member to prevent expansion and thereby secure the cap member on the journal ball for universal movement of the cap and shell members, the shell member being secured to the cap member by an externally accessible fastener.

PATENTED MAY 25 1971

3,580,091

INVENTORS
TOR PETTERSON
LLOYD SPENCER

By Lloyd Spencer
ATTORNEY 3,580,091

ACTUATOR FOR MIXING VALVE

BACKGROUND OF THE INVENTION

The present invention is related to a spherical plural valve actuator, U.S. Pat. No. 3,395,733, which discloses a journal ball and cam cap construction in which the cam cap is retained for universal movement on the journal ball by a retainer ring screw threaded to the cam cap. This arrangement requires that the movement limiting cam be provided in an undulating stop shoulder formed at the base of the journal ball rather than in the cam cap or its retainer, unless the retainer is oriented in a predetermined position with respect to the cam cap.

SUMMARY OF THE INVENTION

The present invention is summarized in the following objects:

First, to provide an actuator for mixing valves having a journal ball, the actuator including a novel cap member having a semispherical cavity encompassing more than half the journal ball and slitted so that the cap member may be fitted over the journal ball or removed therefrom by expansion of the peripheral portion of the cap member, and a novel cover member fitting over the cap member and conforming thereto so as to restrain expansion of the cap member and retain the cap member on the journal ball, but permitting universal movement thereof.

Second, to provide an actuator for mixing valves, as indicated in the preceding object, wherein the cap member is provided with an external asymmetrical rib and the cover member with a mating recess, and wherein an externally accessible fastener extending essentially normal to the surrounding surface extends into the rib to secure the members together.

Third, to provide an actuator for mixing valves of the type indicated wherein the cover member is internally accessible to permit mounting a separate handle thereon, should this be desirable.

Fourth, to provide an actuator for mixing valves of the type indicated which is particularly adaptable, but not limited to, a construction in which the movement limiting cam may be incorporated in the cap and cover members permitting an undulation free stop shoulder at the base of the journal ball.

Fifth, to provide an actuator which is particularly adapted for use in conjunction with the mixing valve disclosed in the copending application, entitled Mixing Valve And Replaceable Valve Cartridge Therefor, filed Apr. 10, 1969 Ser. No. 814,990; however, the actuator may be adapted, but not limited to, mixing valves shown in U.S. Pat. Nos. 3,395,733; 3,384,121; 2,792,847 and 2,653,628.

Figure 2:
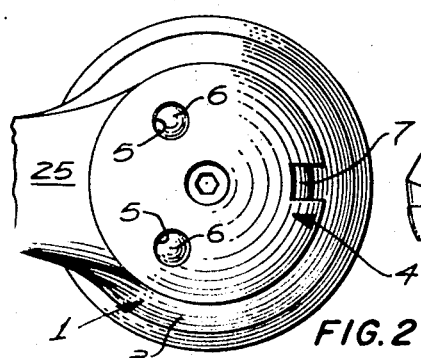
FIG. 2 is an enlarged plan view of the mixing valve with the actuator removed, and the spout shown fragmentarily.

The present invention is particularly adapted, but not limited, to use in conjunction with the mixing valve disclosed in the copending application, Ser. No. 814,990. As more fully disclosed in the copending application, the mixing valve includes a base structure 1, which may incorporate a swing spout 2, and which terminates at its upper end in an annular stop shoulder 3. Mounted on the base structure is a journal ball 4, having parallel bores 5, which receive cam followers 6. The journal ball is also provided with a key slot 7 in which slides a key pin 8.

The mixing valve actuator includes a cap member 9, having a socket 10 of spherical contour, which extends beyond a hemisphere and terminates in a stop shoulder in the form of a three-lobe movement limiting cam 11. An aperture 12 receives the key pin 8. As more fully disclosed in the copending application and the U.S. Pat. Nos. 3,395,733 and 3,384,121, the interaction of the cam 11 and stop shoulder 3, and the interaction of the key pin 8 held in the aperture 12, and the key slot 7 cause the cap member to generate an essentially triangular cam area 13 in relation to each cam follower. The slope of each cam area 13 is such that a hot and a cold water valve, controlled by the cam followers, are caused to open and close in unison or in opposition, depending on the direction of movement of the cap member on the journal ball.

That portion of the cap member which projects beyond a hemisphere serves to retain the cap member on the journal ball; however, the cap member is provided with a set of slits 14, forming a ring of yieldable fingers 15 so that the cap member may be fitted onto the journal ball or removed therefrom.

Externally, the cap member 9 is provided with a flattened extremity 16, preferably parallel to the planes which define the crests and the valleys of the movement limiting cam 11. Also, at the side of the cap member occupied by the aperture 12 and key pin 8, which is preferably the backside of the cap member as viewed in FIG. 1, there is provided a boss 17 which emerges from the cap member and terminates at the extremity 16.

The cap member 9 is covered by a shell member 18, preferably formed of metal, whereas the cap member is preferable molded on high strength plastic. Internally, the shell member conforms to the outer surface of the cap member. The region of the cap member 9 extending beyond a hemisphere is, externally cylindrical and the mating portion of the shell member is internally cylindrical so that the shell member may be fitted over the cap member and when so fitted, prevents the fingers 15 from expanding so that the cap member is retained on the journal ball, but is free for universal movement to the extent permitted by the cam 11, the key slot 7 and the key pin 8. The shell member terminates in a cam 19 which conforms to the cam 11.

Externally, the shell member 18 may be contoured for aesthetic purposes. At the region overlying the boss 17, the shell member is provided with an aperture 20 which receives a screw 21. The screw extends into a mating socket 22 in the boss, thereby to secure the cap member and shell member together The extremity of the screw may be tapered, as indicated by 23 to aid in forcing the aperture 20 in the shell member and the socket 22 in the cap member into registry.

The shell member 17 may terminate in a flat side 24, overlying the flat extremity 16, or may continue to form an integral handle. If, as illustrated, a separate handle 25 is desired, it may be attached by concealed screws 26, accessible from the interior of the shell member.

Assembly and operation of the actuator is as follows:

The cap member 10 is slipped over the journal ball 4; the key pin 8 is inserted in its aperture 12 so as to protrude into the key slot 7. The shell member 18 and the handle 25 are preassembled and the shell member is fitted over the cap member with its cam extremity 19 in registry with the movement limiting cam 11, whereupon the screw 21 is inserted. When so assembled, the cap member journals on the ball 4, but cannot be removed therefrom.

Figure 1:
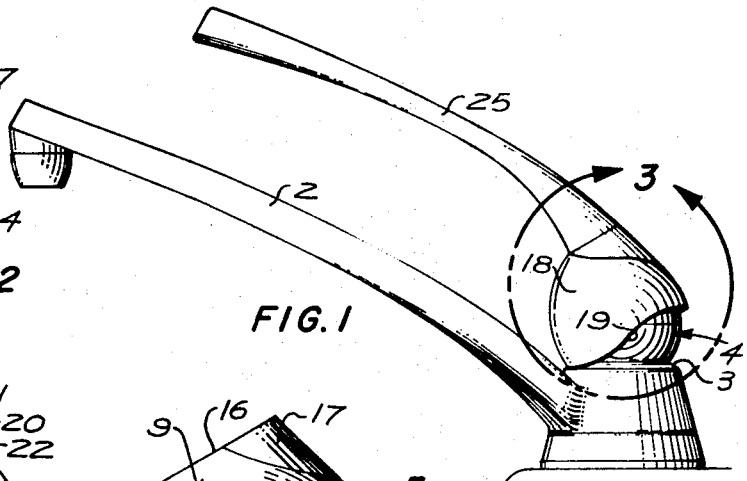
FIG. 1 is a side view of a mixing valve incorporating the actuator.
Figure 3:
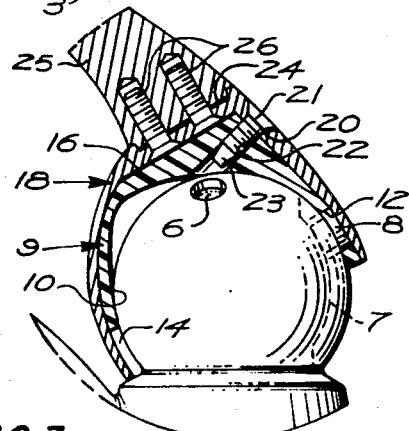
FIG. 3 is an enlarged partial sectional, partial elevational view, taken within circle 2 of FIG. 1.
Figure 4:
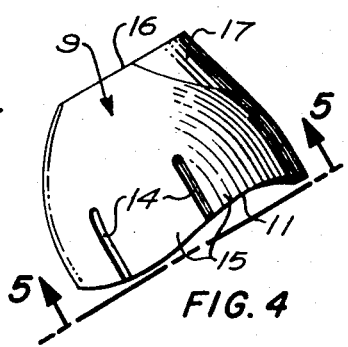
FIG. 4 is a side view of the cap member.

Once assembled on the mixing valve, the actuator handle, when moved in a forward-rearward direction as viewed in FIG. 1, varies the volume of water discharged from the mixing valve, and when moved laterally, varies the temperature of opening one valve and closing the other, all as more fully disclosed in the aforementioned patents.

Figure 5:
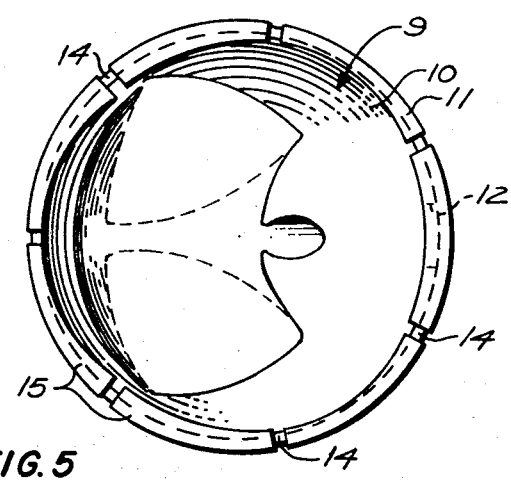
FIG. 5 is a further enlarged end view of the cap member, taken from 5-5 of FIG. 4.
Figure 6:
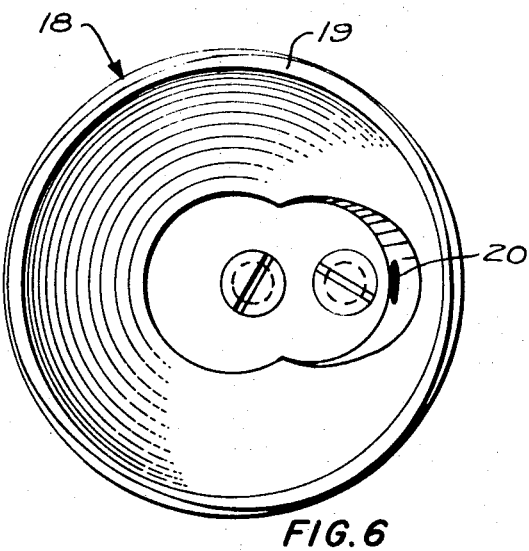
FIG. 6 is a similar enlarged end view of the cover member.
Figure 7:
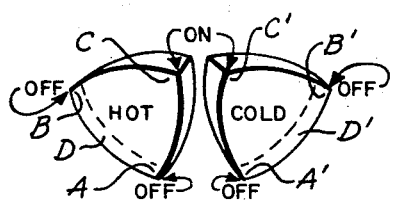
FIG. 7 is a diagrammatical view, showing the dual cams.

For example, as the "hot" valve moves from A to B as shown in FIGS. 5 and 7, and the "cold" valve moves simultaneously from A' to C', the hot valve remains closed while the cold valve moves from closed to full open. AS the hot valve moves from B to C and the cold valve moves simultaneously from C' to B', the hot valve is opened and the cold valve is closed. Finally, as the hot valve is moved from C to D, and the cold valve is moved from B' to A', the hot valve is closed while the cold valve remains closed. Movement within smaller areas of the cam surfaces produces proportionally smaller movements of the valves.

Figure 8:
FIG. 8 is a diagrammatical view, showing a typical cam profile.

With reference to FIG. 8, the cam slope profile from A to C or A' to C', as well as from B to C or B' to C' as well as corresponding intermediate points in the two cam areas may be such that the rate of change in volume may be programmed to have the desired rate of water flow at any corresponding selected point on the two cams. For example, at lower volumes a greater handle movement for volume change may be provided than that provided for higher volumes. Also, in the valve shutoff zone, indicated by D and D' in FIGS. 7 and 8, a greater cam slope may be provided bordering the "off" margin of the cam area so that minimal area of each cam is required to effect final shutoff.

It should be noted that while it is preferred that the movement limiting cam be formed at the extremities of the cap member and shell member, these extremities may be essentially planar and the cam formed on stop shoulder 3.

While particular embodiments of this invention have been shown and described, it is not intended to limit the same to the details of the constructions set forth, but instead, the invention embraces such changes, modifications and equivalents of the various parts and their relationships as come within the purview of the appended claims.

We claim:

1. An actuator for a mixing valve having a pair of valve operating cam followers adapted to extend from the surface of a journal ball, said actuator comprising:
   a. an inner cap member having a socket conforming to and journaled on said ball, said socket being greater than a hemisphere, said cap member terminating in a set of yieldable elements adapted to spread to permit fitting said cap member onto said journal ball or removal therefrom;
   b. an outer shell member having a socket fitting over said inner cap member and including portions mating the exterior surfaces of said yieldable elements to restrain said yieldable elements thereby to prevent removal of said cap member from said journal ball;
   c. the exterior surfaces of said yieldable elements and the mating portions of said outer shell member cooperating to form a sliding fit to permit removal of said outer shell member from said inner cap member, thereby to permit removal of said inner cap member from the journal ball;
   d. an externally accessible fastener extending through said outer shell member into said inner cap member to secure said members together and prevent removal of said inner cap member from said journal ball;
   e. and cams formed on the inner surface of said cap member for causing said cam followers to operate said mixing valve.

2. An actuator, as defined in claim 1, wherein:
   a. a first stop shoulder surrounds the base side of said journal ball;
   b. a second stop shoulder forms the extremity of said cap member;
   c. a slot and key means is incorporated in said journal ball and said cap member confines relative movement of said journal ball and cap member to two axes of travel;
   d. and at least one of said stop shoulders is contoured to confine movement of said cap member to the boundaries of said cams.

3. An actuator, as defined in claim 1, wherein:
   a. one of said stop shoulders is contoured to cause said cap member to generate essentially triangular cam areas.

4. An actuator, as defined in claim 1, wherein:
   a. said cap member includes at least one asymmetrically disposed boss extending in the opposite direction from said yieldable elements;
   b. and said shell member defines a mating recess thereby to orient said shell member relative to said cap member.

5. An actuator, as defined in claim 4, wherein:
   a. said fastener penetrates said shell member and enters said boss on said cap member and is disposed essentially normal to the adjacent surface of said shell member.

6. An actuator, as defined in claim 1, wherein:
   a. a separable handle extends from said outer shell member;
   b. and fastener elements extend therein from within said outer shell member.